(12) United States Patent
Chang et al.

(10) Patent No.: US 8,538,814 B2
(45) Date of Patent: Sep. 17, 2013

(54) SYSTEMS AND METHODS OF PROVIDING ADVERTISING CONTENT

(75) Inventors: Nelson Liang An Chang, Palo Alto, CA (US); Niranjan Damera-Venkata, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1440 days.

(21) Appl. No.: 11/827,397

(22) Filed: Jul. 11, 2007

(65) Prior Publication Data

US 2009/0018911 A1 Jan. 15, 2009

(51) Int. Cl.
*G06Q 30/00* (2012.01)

(52) U.S. Cl.
USPC .......................... 705/14.64; 463/9; 345/169

(58) Field of Classification Search
USPC .................. 705/14.64; 463/39; 345/169
See application file for complete search history.

(56) References Cited

U.S. PATENT DOCUMENTS

| | | | |
|---|---|---|---|
| 5,560,603 A | 10/1996 | Seelig et al. | |
| 5,976,015 A | 11/1999 | Seelig et al. | |
| 6,364,314 B1 | 4/2002 | Canterbury | |
| 6,408,278 B1* | 6/2002 | Carney et al. | 705/14.73 |
| 7,192,345 B2 | 3/2007 | Muir et al. | |
| 2004/0165006 A1* | 8/2004 | Kirby et al. | 345/740 |
| 2005/0233794 A1* | 10/2005 | Cannon et al. | 463/16 |

FOREIGN PATENT DOCUMENTS

| | | |
|---|---|---|
| EP | 1186329 B1 | 11/2006 |
| GB | 2387950 A | 10/2003 |
| JP | 2001-340510 | 12/2001 |
| JP | 2004-157499 | 6/2004 |

* cited by examiner

*Primary Examiner* — John Van Bramer
*Assistant Examiner* — Stacie Gatling

(57) ABSTRACT

A system for providing advertising content includes a public display; a database configured to store the advertising content; and a central processing element configured to dynamically interact with participants in an activity and present the advertising content in connection with information about the activity on the public display. A method of providing advertising content includes conducting an activity involving participants; receiving input regarding the participants engaged in the activity; and displaying advertising content from a database concurrently with information regarding the activity.

20 Claims, 9 Drawing Sheets

SYSTEMS AND METHODS OF PROVIDING ADVERTISING CONTENT

BACKGROUND

Providers of goods and services constantly seek to inform the public of the existence and selling points of their products through advertising. Advertisers need to present information about their products to customers and potential customers. Traditionally, advertising has been provided through various media, such as on television, in magazines and newspapers, on web-sites, on roadside billboards, on signage at sporting and other events, by mail, on moving vehicles, etc.

Providers of goods and services, acting as advertisers, typically pay for the use of media to make their advertisements available to the public. These media are viewed by many people, some targeted at specific groups of people with varying degrees of effectiveness. Advertising is most effective when it draws the attention of those likely to be interested in the goods or services of the advertiser long enough that the advertiser's message can be communicated.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
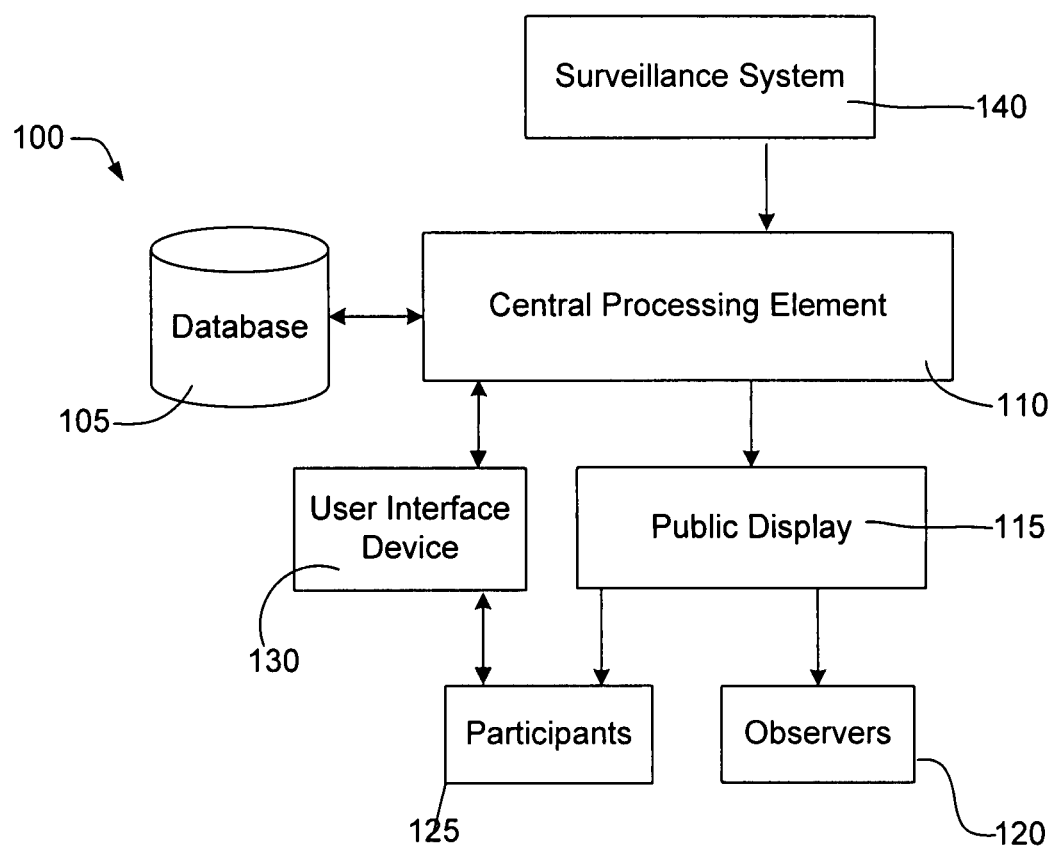
FIG. 1 is a block diagram of an exemplary system of providing content to consumers.

In some cases, there may be an opportunity to advertise products or services in a public location having a high amount of foot traffic, such as a shopping center or city plaza. For example, a large-scale electronic display device is provided in the public location and used to display advertising to the people in that location.

However, people passing such a public advertising display are likely to be so absorbed in other matters that the advertising display is simply ignored. The display may also be ignored because of its similarity to traditional television with passive content and a familiar aspect ratio. Additionally, due to the diversity of people that often pass through these locations, it can be difficult to provide advertisements in such an environment that efficiently reach the desired group of potential customers. Advertisers who are paying for advertising services in such environments would consider an effective advertising opportunity to be one that displays advertisements in a way that captures and holds the attention of the people exposed to the advertisement.

The present specification addresses the issues of providing advertising content to people in a public location and describes systems and methods of providing such content. The principles of the present specification enable the delivery of relevant advertising content to one or more public displays, and create an added value to those viewers who opt-in ("participants"), passers-by ("observers"), as well as to the venue. The advertisements hold the attention of viewers by allowing them to participate in or observe a game, contest, or other activity.

The activity may consist of one or more instructions that participants must follow in order to possibly get a prize or award. The prize may consist of, for example, a discount or coupon for a local store or a physical award. Throughout the course of the activity, participants may be required to provide some sort of evidence that the specified steps of activity are being completed. This evidence may, for example, include sending, entering, or learning codes found at different places, learning answers to questions that may be asked later, or providing answers to puzzles or trivia questions. The questions or puzzles may be related to products or services being advertised or the venue where the activity or game is being conducted.

The activity may be organized for individual participants or for teams including multiple participants. The activity may be arranged such that any participant that completes the assigned tasks receives the prize, or may take the form of a contest or competition in which only the fastest participant or team wins.

The activity or game may be engineered or designed by a human system operator each time. Alternatively, a central processing element may automatically engineer each activity by randomly selecting from a set of predetermined locations and challenges. Advertisers may pay to have their locations, prizes or related content selected on a more frequent basis. As the locations involved in the activity and/or the prize for the activity constantly change, participants and observers will continue to have interest in the activity.

Through analysis of participants' activities and locations, the advertising that is determined to be most relevant to the consumers or observers may be provided to them via the public display. Furthermore, the systems of the present specification allow for convenient participant interaction via user interface devices or personal electronic devices such as personal digital assistants (PDAs) and mobile phones.

As used in the present specification and in the appended claims, the term "personal electronic device" refers to an electronic apparatus configured to interact with a central processing element such as a server or a supporting wireless network. Personal electronic devices thus defined may be handheld, battery-powered and may communicate wirelessly with the central processing element through a wireless network. Examples of personal electronic devices include, but are not limited to, personal digital assistants (PDAs), portable and tablet computers, mobile and cellular phones, and custom devices. Personal electronic devices may also include Global Positioning System (GPS) or Radio Frequency Identification (RFID) capabilities to assist the system with identifying or tracking the location of the personal electronic device.

As used in the present specification and in the appended claims, the term "user interface device" refers to an electronic apparatus configured to interact directly with the central processing element. Devices thus defined may receive power and/or communicate with the central processing element through a wired or a wireless connection. Examples of user interface devices include, but are not limited to, keyboards, kiosks, wired devices provided in conjunction with a public display, and custom devices.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary systems and methods of providing advertising content to consumers.

Exemplary Systems

Referring now to FIG. 1, a block diagram of an exemplary system (100) for providing advertising content to consumers and potential customers is shown. The exemplary system (100) may be placed in a public area such as a mall, shopping center, city plaza, museum, place of business, amusement park, transportation hub, or other public area having a significant amount of pedestrian traffic. The exemplary system (100) includes a central processing element (110) with access to a database (105). The central processing element (110) is in communication with and controls a public display (115). The central processing element (110) is also in communication with and controls a user interface device (130).

The public display (115) is an electronic display device that may display images under the control of the central processing element (110). The display (115) may display a still image, a series of still images or motion picture video to convey the desired advertising information or impressions, with or without accompanying audio. The public display (115) may include one or more of video screens, projected images, plasma displays, liquid crystal displays, light emitting diode displays, speakers, and the like. In some examples, the public display (115) may incorporate a number of individual display devices arranged to function as a single large display.

The public display (115) may be placed in a prominent location of the public area such that it may be readily seen by many people passing through the area. For example, a public display (115) consistent with the exemplary system (100) shown may be a large video screen at a mall or shopping center.

The public display (115) may be electronically partitioned into two or more portions at any point to simultaneously accommodate different advertisements or content displays. For example, the public display (115) may at one point be partitioned into two portions, one of which may display information concerning a promotional activity designed to generate interest in the display, and the other portion may display a related advertisement that benefits from the interest generated in the promotional activity. In other examples, the display (115) may be partitioned into three or more portions, with each portion displaying various activity or advertising content.

Consumers or others who see the public display (115) may choose to participate in the activity or contest being sponsored. Those who choose to participate are hereinafter referred to as participants (125). Those who choose not to actively participate in the focused activity, but are interested enough to observe some of the activity and are thus exposed to the advertising, are referred to as observers (120).

In the exemplary system (100), the participants (125) view the public display (115) and interact with the central processing element (110) through the user interface device (130). This user interface device (130) may either have a wired connection to the central processing element (110) or a wireless connection. Examples of wired interface devices may include keyboards, kiosks or terminals. Examples of wireless interface devices may include personal electronic devices such as cellular phones, pocket Personal Computers (PCs), or PDA's that can communicate directly with the central processing element (110) through a wireless link such as a typical 802.11(x) WiFi, or Bluetooth connection.

The participants (125) may send and receive data related to the activity or contest by typing, touching, speaking, or otherwise interacting with the user interface device (130). Data received from participants (125) through the user interface device (130) is transmitted to and received by the central processing element (110). In the embodiment shown, data may be received from the participants (125) through the user interface device (130) and then routed to the central processing element (110). Participants may submit data to the central processing element (110) in response to promptings shown on the public display (115).

The activity or contest may take any of a variety of forms. For example, the activity may be a "treasure hunt" or "scavenger hunt" in which participants must find one or more items or locations based on clues or other instructions. The participant may have to verify that he or she has reached the desired locations or items by, or example, obtaining a code or data at that location or item, interacting with a user interface device (130) at that location or item, appearing at the location on a surveillance system (140), collecting a physical item available at the location or by any other suitable means.

In other examples, the activity may be a "race activity" in which participants must complete a challenge or puzzle at one or more specified locations in order to advance. Verification that each challenge has been completed may be required through the user interface device (130) of the system (100) or other means.

The central processing element (110) is configured to receive participants' (125) data and store the data in the database (105). The central processing element (110) may be selected from the group including: computers, servers, application specific integrated circuits, other processors, and the like. The surveillance system (140) may include, for example, a system of video cameras, infrared sensors, mobile phone trackers, user interface locations or any other system capable of tracking or collecting information regarding participates in a game or activity. The mobile phone trackers of the surveillance system (140) may include, for example, use of a Global Positioning System (GPS) and/or triangulation of a mobile phone signal using a number of mobile phone towers.

The database (105) of the present example is configured to store advertising content, such as targeted advertisement content related to the activity being presented. The targeted advertisements may be displayed when a portion of the activity relating to the advertisement takes place. For example, when the lead participant (125) in a "treasure hunt" activity arrives at a clue in front of a shoe store, that store's advertisement may be retrieved from the database (105) and displayed on the public display (115). Businesses or stores in or near the venue may pay the operator of the system for the privilege of displaying their advertising content to users and having the focused activity take place near their place of business.

The public display (115) can be located away from the various points participants must reach in a contest, but can display information about the progress of participants to those observing at the location of the display (115). Participants may be identified by name or by a pseudonym entered into the user interface device (130) for purposes of the activity. In some examples, the system (100) may have cameras at various locations where images can be captured of participants engaging in the activity and then displayed to observers of the activity on the public display (115). Thus, observers at the display (115) can have their attention captured by the ongoing activity even though they are not participating and are not at the location where the activity participants are engaged.

All advertising content, targeting or triggering information, and participant (125) information is stored in the database (105). As indicated, the participants' (125) information may be updated and selectively displayed during the course of the focused activity to reflect their position or status in the activity. Additional content such as coupon codes for use as prizes may also be stored in the database (105).

A variety of revenue models may be used to make the exemplary system (100) and those like it profitable to its owners or operators. In some embodiments, as mentioned above, advertising entities may purchase the right to associate their advertisements with some portion of the activity. Another revenue model would charge businesses, in a mall for example, to have a portion of the activity take place in or near their business. Other possible revenue models may be used. Such models include, but are not limited to, charging advertisers a fixed fee for items listed in the database (105) or charging advertisers a fee based on the amount of time their advertisement was shown on the public display (115).

Figure 2:
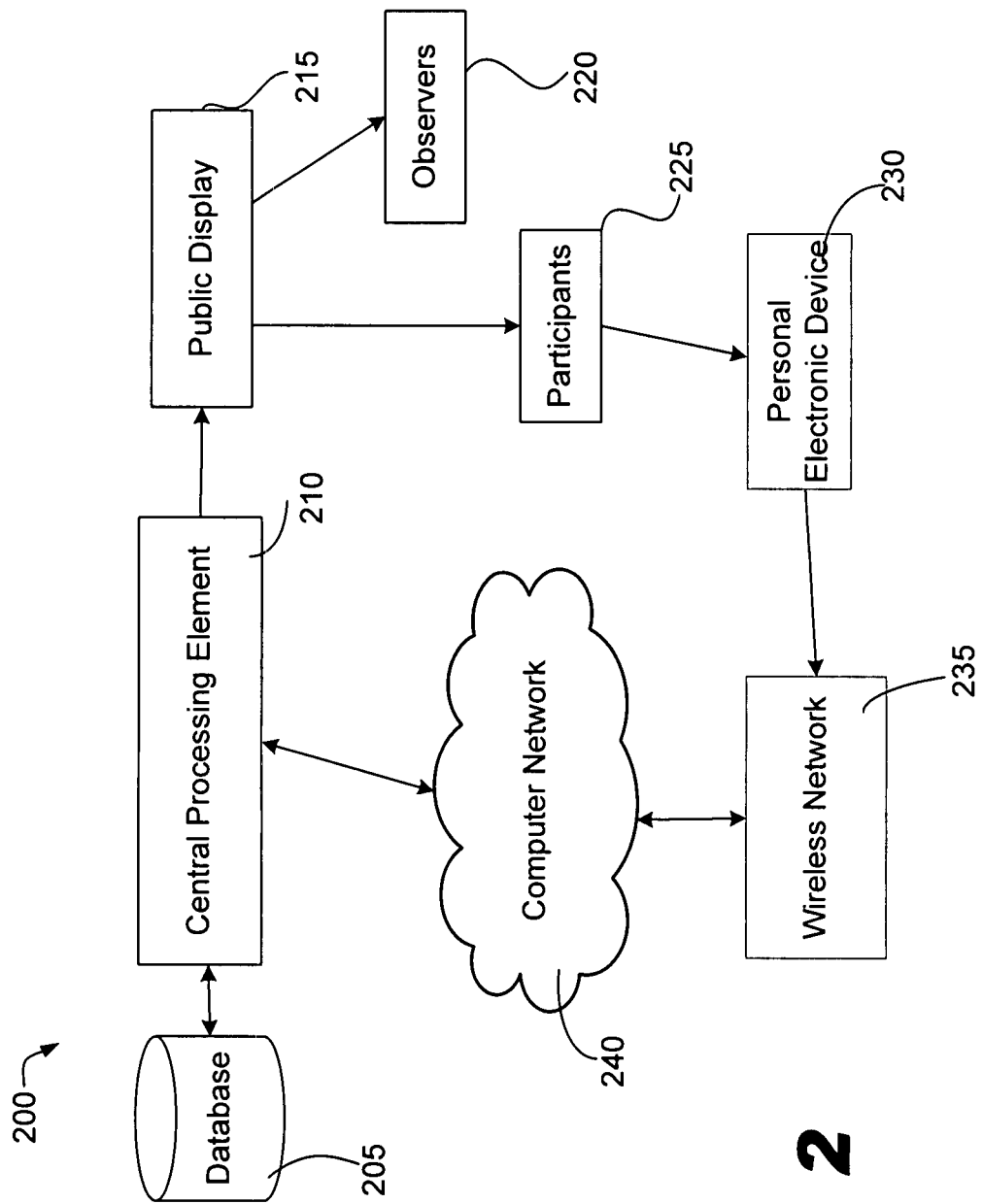
FIG. 2 is a block diagram of an exemplary system of providing content to consumers.

Referring now to FIG. 2, another diagram of an exemplary system (200) for providing advertising content to consumers and potential customers is shown. As above, this system (200) includes a database (205), central processing element (210), and a public display (215). Again, consumers or others who see the public display (215) may choose to participate in the activity or otherwise interact with the central processing element (210).

In the example of FIG. 2, this interaction takes place through the use of a personal electronic device (230) that has access to a wireless network (235), such as a wireless telephone network. This personal electronic device (230) may be, in some examples, a mobile, cellular or satellite phone. Additionally, in other examples, the personal electronic device (230) may be a smart phone incorporating the functionality of a personal digital assistant, a personal digital assistant, or a laptop or other portable compute. The personal electronic device (230) may also be in communication with the central processing element (210) through the wireless network (235) using email, Simple Message Service (SMS) text messaging or internet service. The personal electronic device (230) may be used to communicate with the central processing elements (210) with regard to an on-going activity or get information about a future activity or contents or relevant advertising or other information.

The wireless network (235) may provide a connection to a computer network (240) which, in turn, is connected to the central processing element (210). The computer network (240) can be a local area or wide area network affiliated with a wireless telephone network (235) or may be a global computer network, such as the Internet.

Participants (225) may transmit data that indicates their desire to participate in the activity, their location or status in the activity, or other information required for participation. The central processing element (210) may use this information to determine relevant advertising to display on the public display and/or use it to update the participant's (225) status which may also be displayed on the public display (215).

Figure 3:
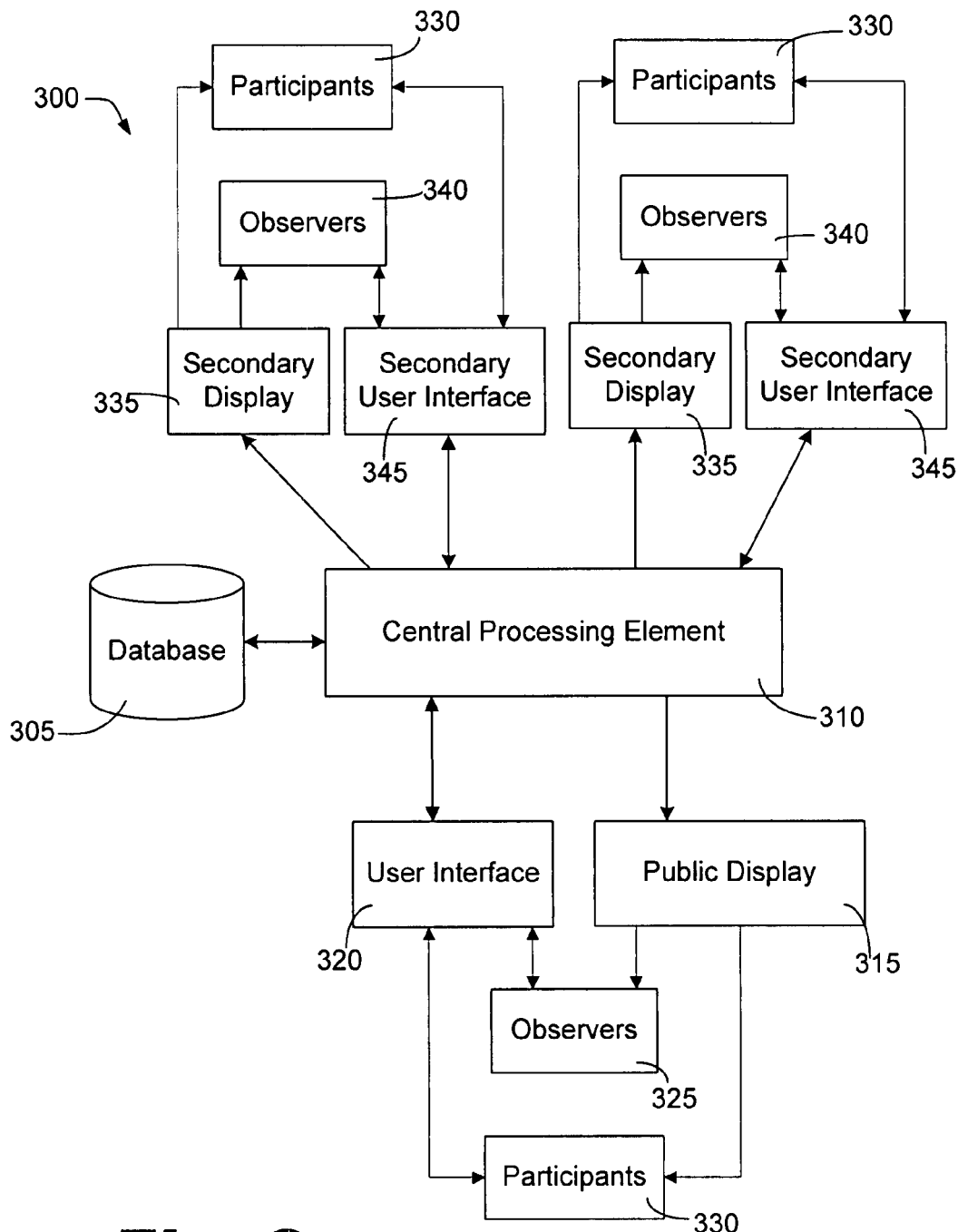
FIG. 3 is a block diagram of an exemplary system of providing content to consumers.

Referring now to FIG. 3, another diagram of an exemplary system (300) for providing content to consumers is shown. This exemplary system includes one main public display (315) with an accompanying user interface (320), and a plurality of secondary displays (335) with accompanying user interfaces (345). These displays (315, 335) are all controlled by a central processing element (310).

The secondary displays (335) and corresponding user interfaces (345) may be strategically placed around a venue so that they may be used as checkpoints that participants (330) in the activity must visit. In an alternative embodiment, the secondary displays (335) may be disposed around several different venues with an activity or portions of an activity occurring at each venue. In this alternative embodiment, the displays (335, 315) may be configured to display information relating to the activities occurring at each separate venue.

Rather than providing information to the central processing element (310) via a personal electronic device (FIG. 2, 230), the participants in the present embodiment interact with the central processing element (310) through the use of a user interface (320, 345) such as a kiosk. In addition, the user interfaces (320, 345) may enable observers to find more information about the services or products that are being advertised on the public or secondary displays (315, 335). The secondary displays (335) allow the advertisements to reach a greater audience. The advertisements displayed on the secondary displays (335) may either be the same advertisements displayed on the public display (315), or they may be individually determined based on the display's (315, 335) location, events occurring in the activity, user input, or other factors. Additionally, the secondary displays (335) may be configured to show content related to the activity.

Figure 4:
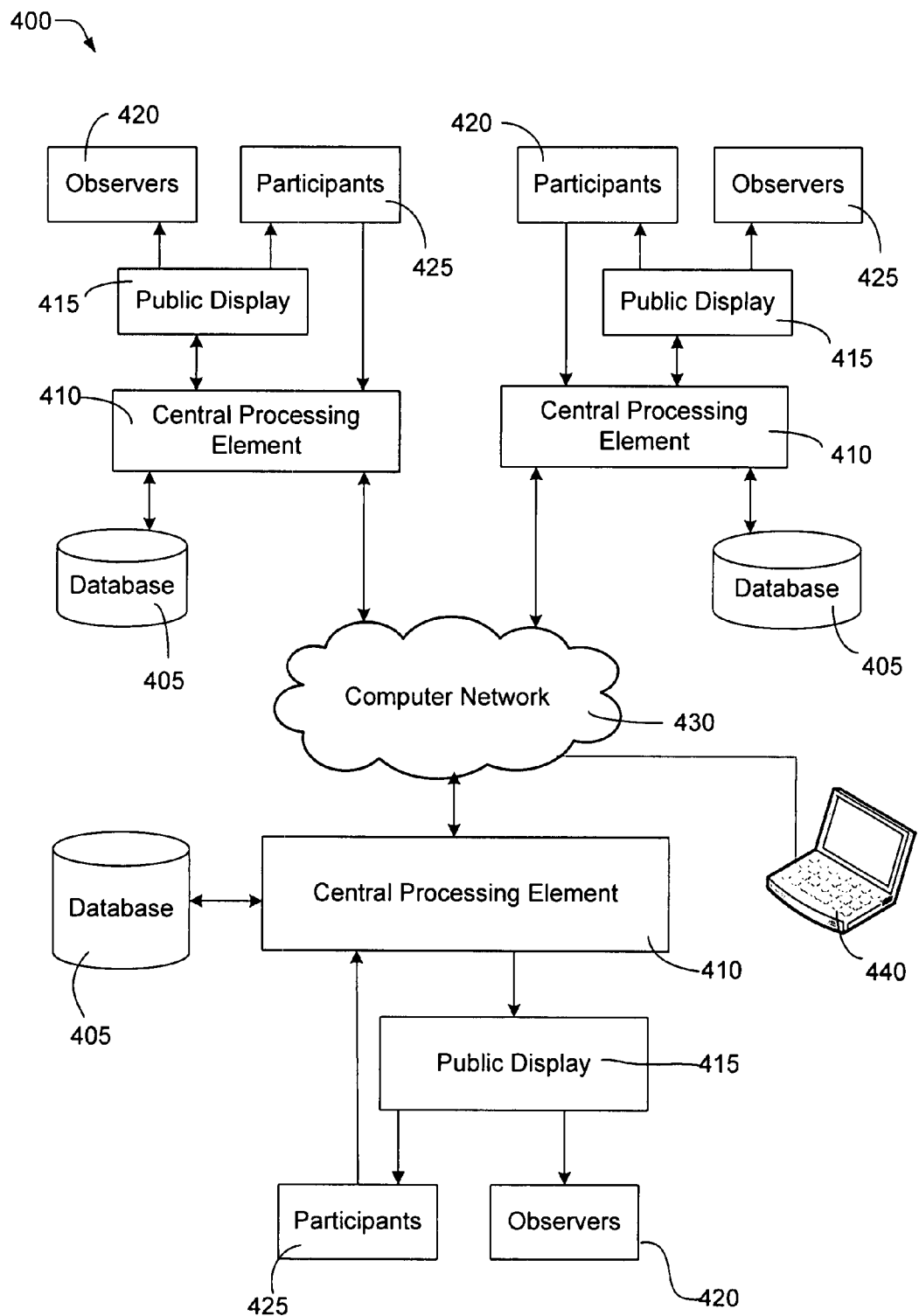
FIG. 4 is a block diagram of an exemplary system of providing content to consumers.

Referring now to FIG. 4, a block diagram of another exemplary system (400) for providing content to customers is shown. The system (400) includes a plurality of databases (405), central processing elements (410), and public displays (415). In this embodiment, the central processing elements (410) are all connected to each other through a computer network (430). The computer network (430) may be a local area or wide area network or may be a global computer network, such as the Internet. In this embodiment, the public displays (415) and their corresponding central processing elements (410) and databases (405) may be located in multiple venues in different geographic locations. In this way, the activity could occur at a plurality of venues simultaneously.

The central processing elements (410) in this embodiment may work together to provide their corresponding public displays (415) with current information regarding the status of the activities at all the participating venues. In this embodiment, observers (420) may be able to view the activity as it occurs at multiple venues. For example, the activity status information may consist of a map view of the location of each participant, live video feeds, or text messages from the participants (425). In any of the examples described herein, participant location may be determined by mobile phone tracking, video surveillance, Global Positioning System (GPS) or other means.

FIG. 4 also illustrates that any number of remote computers (440) can access the system through the computer network (430), e.g., via the Internet. In this way, there may be some observers who track the activity or its participants using a computer (440) at home or from some location other than one of the participating venues. In some such embodiments, these remote observers may also be participants in the activity by working in cooperation or competition with live participants at the participating venues.

Figure 5:
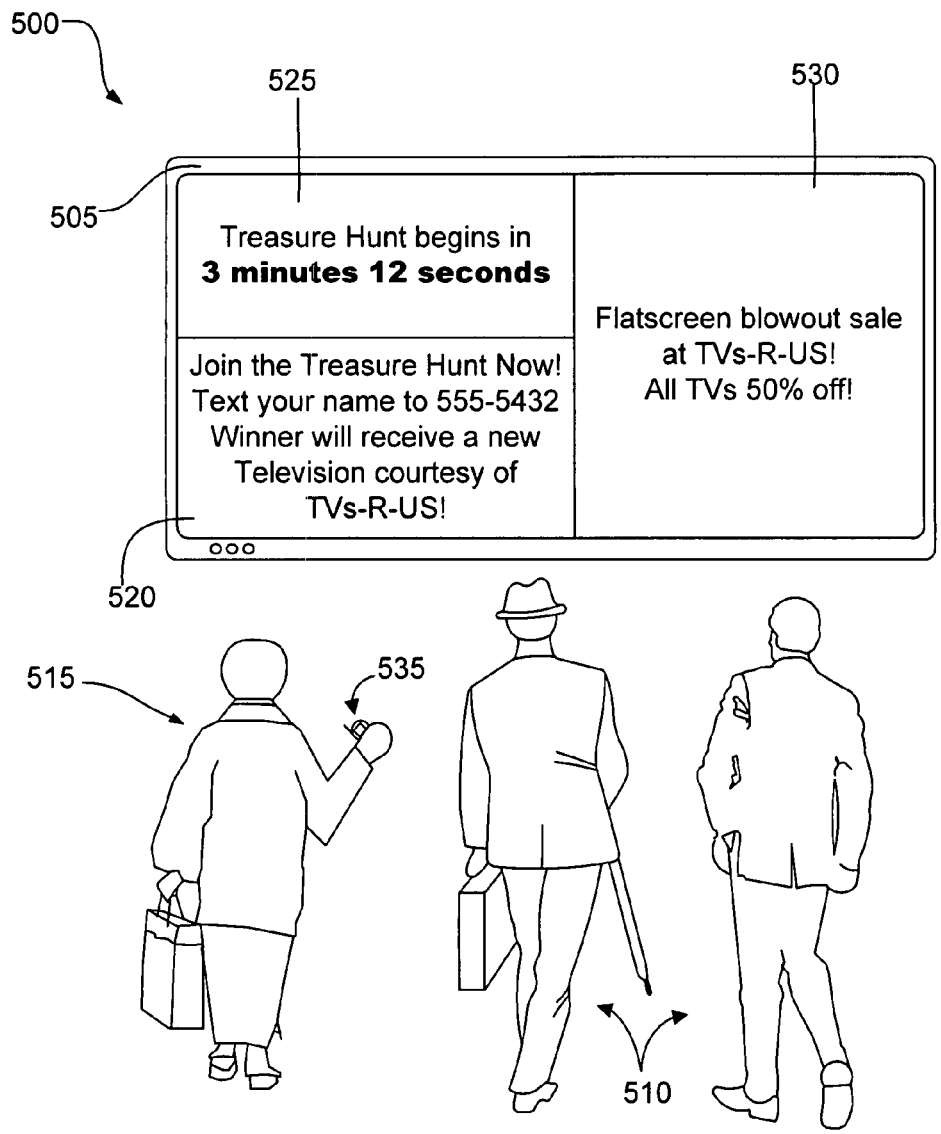
FIG. 5 is an illustration of an exemplary system of providing content to consumers.

Referring now to FIG. 5, an exemplary system (500) is shown for providing engaging advertising content to consumers consistent with the block diagram of FIG. 2 described above. The system (500) is shown before an activity starts while the display (505) is soliciting participants (515). The system (500) includes a public display (505), which at this stage of the example, is partitioned into first (525), second (520) and third (530) portions. The first (525) portion includes an announcement about the starting time of the upcoming activity. The second (520) portion contains an invitation for consumers to become participants (515) in the activity. The third (530) portion is an advertisement related to the prize being awarded to the winner of the activity.

Although in this embodiment the public display (505) is partitioned into three portions, in other embodiments, other configurations may be used. The public display (505) may be apportioned according to the varied requirements of the activity and advertisements. The public display (505) of this embodiment is a large screen at a prominent location in a public area, such as a shopping mall or theme park. The public display (505) may include one or more of video screens, projected images, plasma displays, liquid crystal displays, light emitting diode displays, speakers, and the like.

In the present embodiment, the public display (505) solicits participants (515) and invites them to join a "Treasure Hunt" by sending an SMS text message to a particular number. A participant (515) and two observers (510) are also shown. The participant (515) is interacting with the central processing element (210, FIG. 2) by using a personal electronic device (535) to send a SMS message to the specified number. Further instructions may then be sent to the participant's personal electronic device (535) to facilitate participation in the activity.

As the activity progresses, the participant (515) may be required to send additional messages to the central processing element (210, FIG. 2) as evidence of completed tasks. These messages may be displayed along with other information relating to the activity on the public display (505). Additionally, these messages may be used by the central processing element (210, FIG. 2) to determine and display relevant advertising material on the public display (505).

Figure 6:
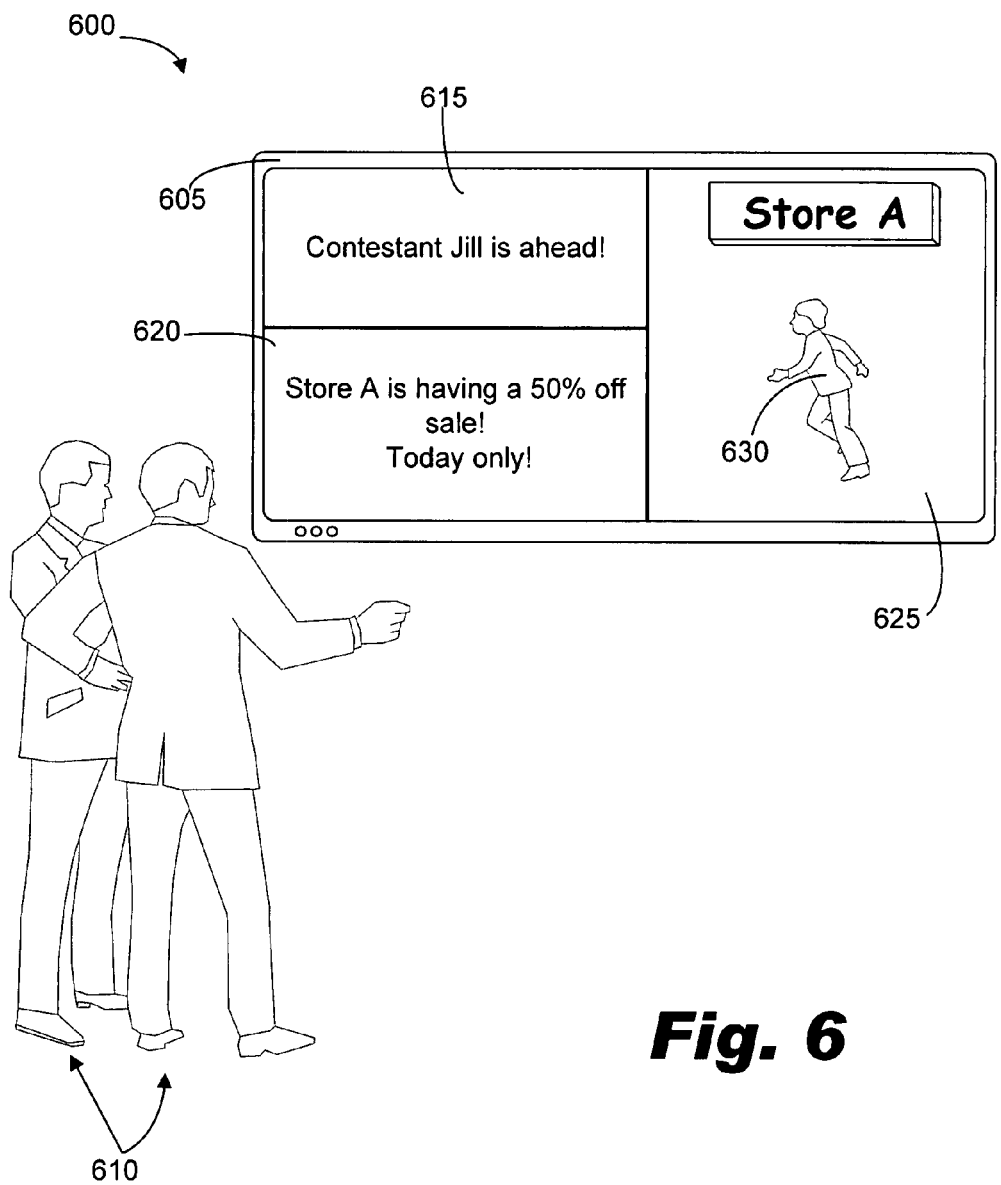
FIG. 6 is an illustration of an exemplary system of providing content to consumers.

Referring now to FIG. 6, an exemplary system (600) is shown consistent with the block diagrams of FIGS. 1-4 described above. In the example of FIG. 6, a public display (605) is shown at a point during the occurrence of an activity or game. Just as in FIG. 5, the public display (605) is partitioned into first (615), second (620), and third portions (625), although other configurations may be used.

In this exemplary configuration, the first portion (615) includes an announcement about the status of the activity. The information displayed on this portion of the screen may have been received from a participant (630) and interpreted by the central processing element (110, FIG. 1). For example, at each stage in the activity, the participants (630) may be required to interact with a kiosk or other user interface (130, FIG. 1) in order to provide evidence that the designated tasks of the activity or game are being completed. This information could then be configured for display on the public display (605) by the central processing element (110, FIG. 1), for example, as a score-ordered or time-ordered ranking or the participants.

In another embodiment, the participants (630) may be required to send SMS messages from the different stages of the activity. The central processing element (110, FIG. 1) may receive these messages and determine which participant (630) is in the lead and display this information on the public display (605). The SMS messages may include information only available at locations the participants are visiting as part of the activity as automatic verification that the texting participant is, in fact, at that point in the activity.

The second portion (620) contains an advertisement. This advertisement could be chosen randomly by the central processing element (110, FIG. 1), or it could be related to the activity. In the present embodiment, the advertisement being shown is related to the activity. A particular store's advertisement is shown as the lead participant (630) passes that store in the course of the activity. In other embodiments, an activity may be sponsored by an entity whose advertisements could then be shown on the public display (605) during the entire activity.

The third portion (625) of the public display (605) in this embodiment is a live video of the activity. This video shows the lead participant (630) passing the store whose advertisement is being displayed on the second portion (620) of the public display (605). This portion of the public display (605) could alternatively display the participants' (630) locations on a map type view of the venue. In yet another exemplary system, video or pictures from a concurrently occurring activity in another location could be shown on this or another portion of the public display (605).

Two observers (610) are also show in FIG. 6. These observers (610) are drawn to the public display (605) because of the compelling content provided by the activity. Because of the public's interest in non-scripted entertainment and competitions, a public display (605) featuring this sort of content is more likely to capture and hold the observers' (610) attention. Likewise, activities of this nature provide a recurring draw because the activity and participants (630) may never be the same.

Figure 7:
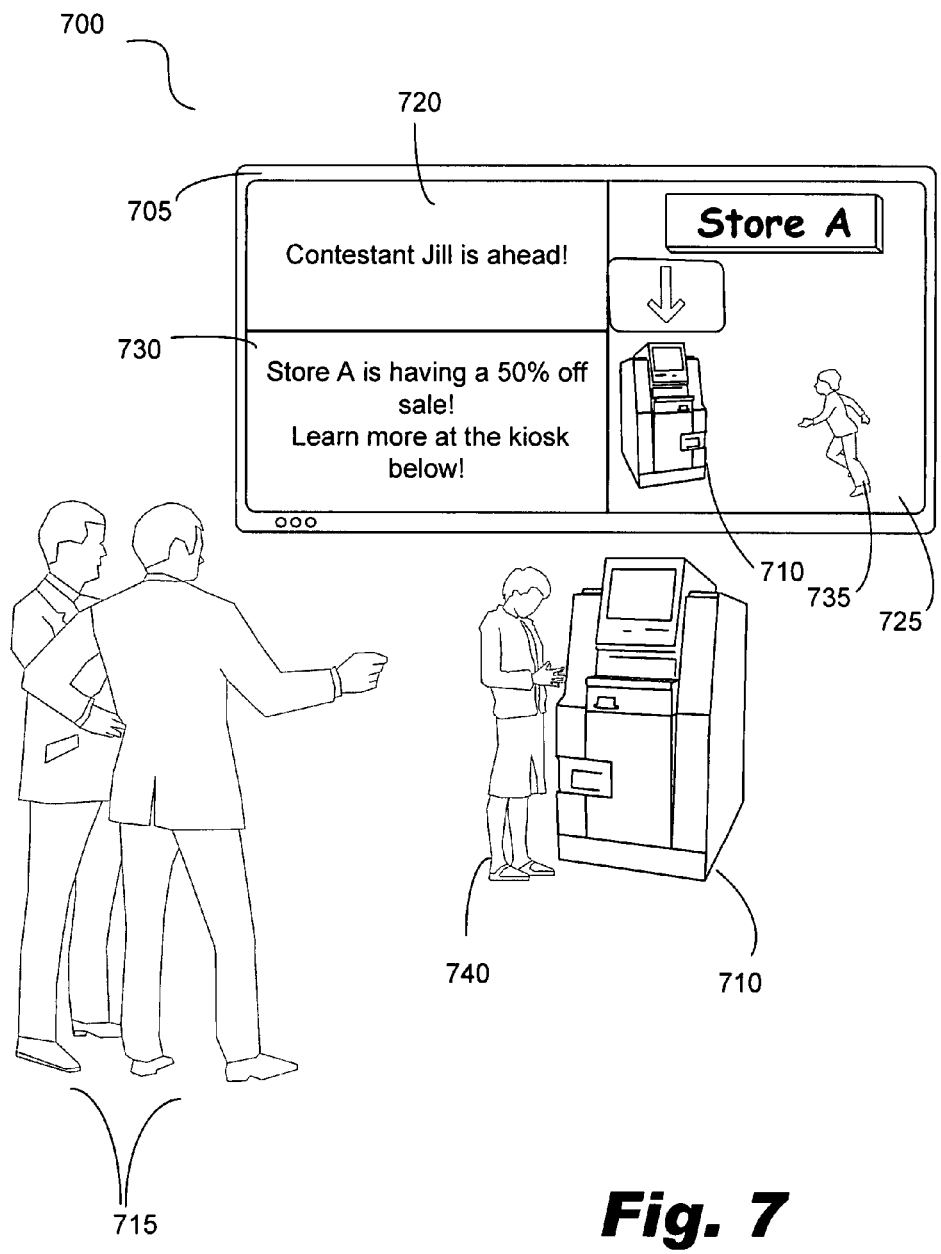
FIG. 7 is an illustration of an exemplary system of providing content to consumers.

Referring now to FIG. 7, an exemplary system (700) is shown consistent with the block diagram of FIG. 3 described above. This figure also shows an exemplary system (700) during the occurrence of an activity. In this embodiment, user interfaces (710) in the form of kiosks are utilized. These user interfaces (710) allow participants (735) to enter and receive data in the course of the activity, and also allow observers (715) to obtain more information about advertised products or stores.

FIG. 7 also depicts a public display (705) similar to the displays described above. As above, the public display (705) is divided into portions one (720), two (730) and three (725). Portion one (720) gives current information on the state of the activity. Portion two (730) displays an advertisement and offers more information to the observers (715, 740) through the use of the user interface (710), which, in this example, is a kiosk. Portion 3 (725) displays a picture or video of the lead participant (735) in the activity approaching a user interface (710) in the form of a kiosk that the participant (735) may use to perform a required step in the activity.

FIG. 7 also depicts three observers (715, 740), one of whom (740) is interacting with the central processing element (110, FIG. 1) through the kiosk. Observers (740) who use the user interfaces (710) may be able to gain information on advertised products, or current or future activities.

Exemplary Methods

Figure 8:
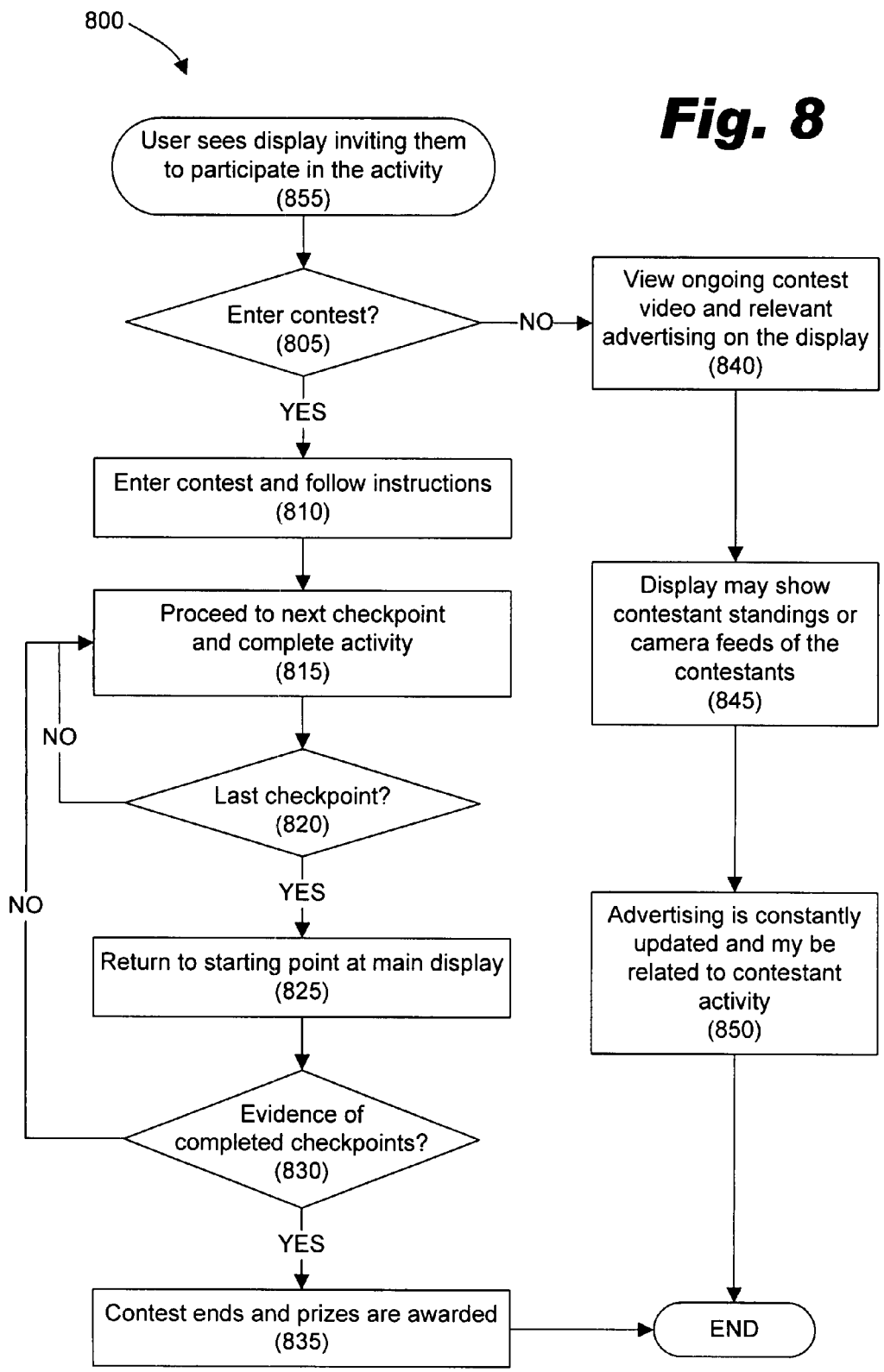
FIG. 8 is a flowchart illustrating an exemplary method of providing content to consumers.

Referring now to FIG. 8, a flowchart illustrating a method (800) of providing an activity and relevant advertising to consumers is shown. As shown in FIG. 8, the method (800)

begins when the user sees (step 855) a public display or activity kiosk inviting them to participate in the activity. The user then determines (determination 805) whether to participate. If the user determines (determination 805) not to participate then he is designated as an observer. Observers may continue to view (step 840) ongoing contest video and relevant advertising on the display. The display may also show (step 845) participant standings or other information about the activity.

If the user determines to enter the activity, the user is designated as a participant. Participants are given (step 810) one or more instructions through interaction with the central processing element. Then, participants may proceed (step 815) to the next checkpoint and complete any required steps associated with that checkpoint before proceeding.

When the last checkpoint is completed (determination 820), the participants may return (step 825) to the main display where the participants may be required to furnish evidence of completed checkpoints. For example, the participant may have collected data or codes available only at the checkpoints, taken pictures of specific items at each checkpoint, collected physical tokens or objects available at the various checkpoints, or otherwise identified themselves to the system at each checkpoint. In some such embodiments, the system may have automatically collected evidence that the participant has visited and/or completed all designated checkpoints. If the participant has completed (determination 830) all the required steps, the contest ends (step 835) and prizes may be awarded. In other embodiments, the participants may be required to return to the main display or starting point after each checkpoint to update the results and provide evidence of checkpoint completion.

Figure 9:
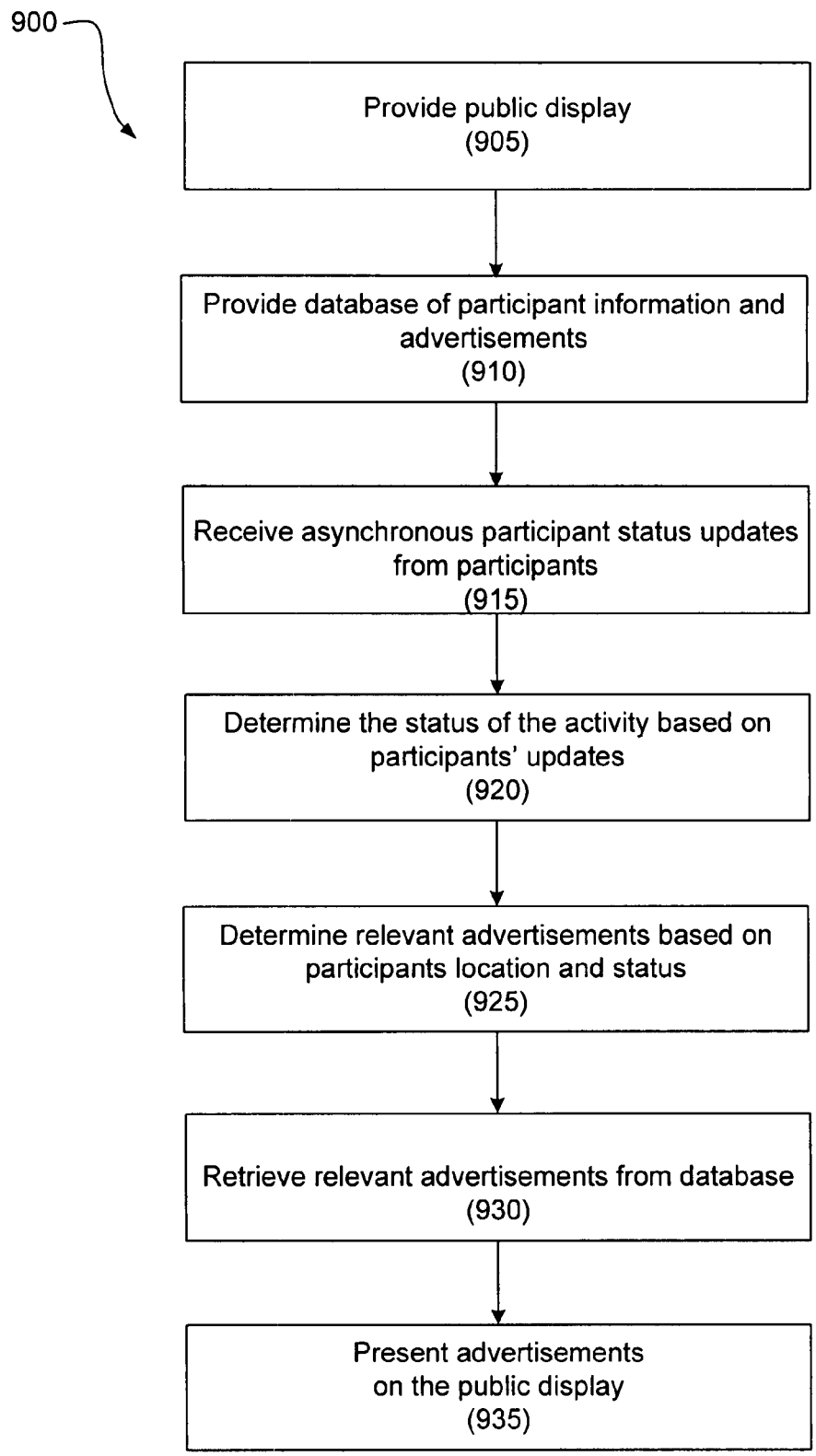
FIG. 9 is a flowchart illustrating an exemplary method of providing content to consumers.

Referring now to FIG. 9, a flowchart illustrating a method (900) of providing consumer content to consumers is shown. The method includes providing (step 905) a public display, providing (step 910) a database of participant information and advertising materials, receiving (step 915) asynchronous participant status updates, determining (step 920) the status of the activity, determining (step 925) relevant advertising materials, retrieving (step 930) relevant advertisements or other non-advertising content from the database, and presenting (step 935) the advertisements and activity status information on the public display.

The consumer content may be selected from the group consisting of: advertisements for products or services, product information, pricing information, promotion information, offers, coupons, cross-promotions, and combinations thereof. Furthermore, the method (900) may include partitioning the public display to concurrently present consumer content of different types.

Additionally, at least a portion of the participant status updates may be transmitted to a central processing element using a personal electronic device, user interfaces, or both. Additionally, at least a portion of the consumer content may be responsively provided to respective users via the same personal electronic devices or user interfaces.

The preceding description has been presented only to illustrate and describe embodiments and examples of the principles described. This description is not intended to be exhaustive or to limit these principles to any precise form disclosed. Many modifications and variations are possible in light of the above teaching. For example, the various components of the system described herein may be implemented in any combination of hardware and software with the functionality of any one or several components deployed in one or more system components.

What is claimed is:

1. A system for providing advertising content, comprising:
a public display;
a database configured to store said advertising content; and
a central processing element configured to receive input from participants in an interactive activity officiated by said central processing element, dynamically interact with said participants based on said received input, and present said advertising content in connection with information about said activity on said public display to observers not participating in said activity.

2. The system of claim 1, wherein said central processing element selects advertising content for display that is related to events occurring concurrently in said activity.

3. The system of claim 1, further comprising a surveillance system for collecting information on said participants engaged in said activity.

4. The system of claim 1, wherein said central processing element partitions said public display to provide separate portions capable of independently displaying content.

5. The system of claim 1, further comprising at least one user interface, wherein users may provide input to said central processing element.

6. The system of claim 5, wherein said user interface is configured collect said input from said participants in said activity.

7. The system of claim 1, further comprising a personal electronic device corresponding to each said participant, wherein each said participant provides information to said central processing element via said personal electronic device.

8. The system of claim 7, wherein said central processing element provides information to each said participant via the personal electronic device corresponding to that participant.

9. The system of claim 1, further comprising a plurality of secondary displays arranged at locations separate from said public display.

10. The system claim 9, further comprising a plurality of user interfaces, wherein at least one user interface is associated with each said secondary display.

11. The system of claim 1, further comprising a plurality of central processing elements with corresponding databases, and public displays.

12. The system of claim 1, wherein said activity takes place at a plurality of venues concurrently.

13. A method of providing advertising content, said method comprising:
providing a public display controlled by at least one central processing element;
conducting an activity with said public display, said activity involving participants;
receiving input regarding said participants engaged in said activity from said participants in said central processing element; and
displaying advertising content from a database concurrently with information regarding said activity to observers not participating in said activity.

14. The method of claim 13, wherein said activity comprises a treasure hunt.

15. The method of claim 13, wherein receiving input comprises receiving information transmitted by said participants from personal electronic devices.

16. The method of claim 13, wherein receiving input comprises receiving input through user interfaces devices associated with a display device.

17. The method of claim 13, wherein said information regarding said activity comprises a map indicating locations of said participants.

18. The method of claim 13, wherein receiving input regarding said participants comprises operating a surveillance system within an area where said activity is being conducted.

19. The method of claim 13, wherein said activity occurs at a plurality of venues concurrently.

20. The method of claim 13, further comprising offering a prize for a winner of said activity.

* * * * *

UNITED STATES PATENT AND TRADEMARK OFFICE
CERTIFICATE OF CORRECTION

PATENT NO. : 8,538,814 B2  
APPLICATION NO. : 11/827397  
DATED : September 17, 2013  
INVENTOR(S) : Nelson Liang An Chang et al.

Page 1 of 1

It is certified that error appears in the above-identified patent and that said Letters Patent is hereby corrected as shown below:

In the Claims

In column 10, line 26, in Claim 6, delete "collect" and insert -- to collect --, therefor.

In column 10, line 40, in Claim 10, delete "system" and insert -- system of --, therefor.

Signed and Sealed this  
Thirty-first Day of December, 2013

Margaret A. Focarino  
*Commissioner for Patents of the United States Patent and Trademark Office*